Nov. 2, 1926.
J. L. DE ANGELIS
MACARONI DIE
Filed Feb. 27, 1924
1,605,394
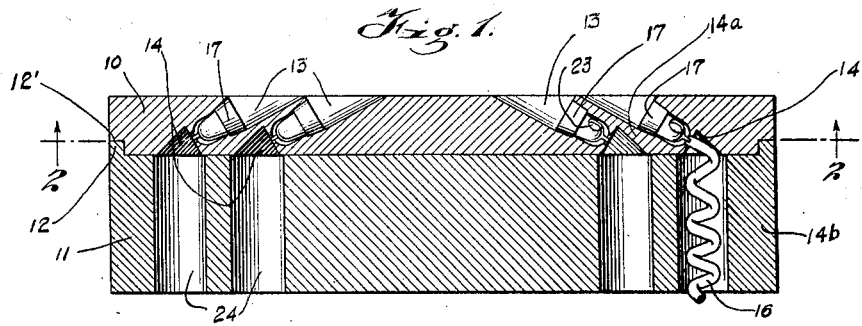
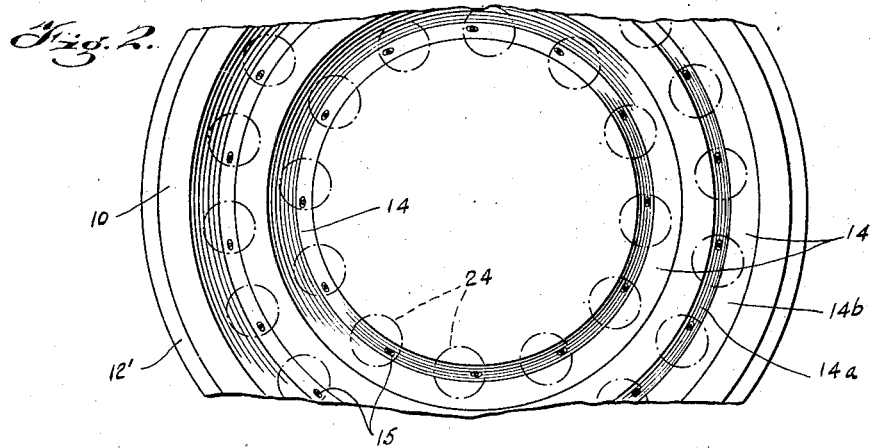
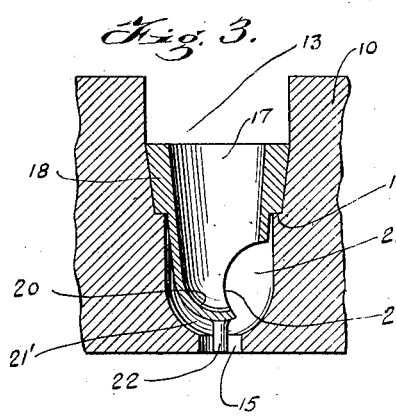
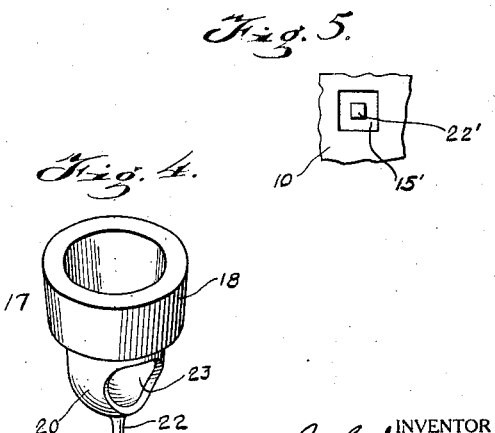
INVENTOR
J. L. De Angelis
BY
Geo. L. Beeler
ATTORNEY Patented Nov. 2, 1926.

1,605,394

UNITED STATES PATENT OFFICE.

JOHN L. DE ANGELIS, OF MOUNT VERNON, NEW YORK.

MACARONI DIE.

Application filed February 27, 1924. Serial No. 695,606.

This invention relates to machines or apparatus for the treatment or manipulation of plastic materials and has particular reference to the molding or shaping of doughs or the like for food products, such as macaroni.

Among the objects of the invention is to produce macaroni of a peculiar and characteristically novel and attractive shape, as a result of the direct and normal operation of the die, the strips of macaroni being formed with central bores coincident with the novel shaping of the strips and irrespective of the cross-sectional shape of each strip.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical section of a preferred embodiment of the apparatus.

Fig. 2 is a bottom plan view of the die plate, as seen from the broken line 2—2 of Fig. 1.

Fig. 3 is an enlarged central sectional view of a die unit.

Fig. 4 is a perspective view of a die cup.

Fig. 5 is a detail showing a modified form of die port and core.

Referring now more specifically to the drawings, I show a die plate 10 of any suitable construction, size, shape, or dimensions, but indicated as circular and supported upon a similarly shaped base 11 of any convenient depth. These main parts are shown applied or attached to each other by means including a peripheral flange 12 extending upward from the base into a rabbet 12' formed in the plate.

The upper surface of the plate is drilled or otherwise formed with a multiplicity of die pits 13 extending downward and laterally at oblique angles. While the relative arrangement of the pits may vary as desired according to the shape of the plate or otherwise, it will be observed that in the form shown, in which the plate is circular, the pits are arranged in circles concentric with the vertical central axis of the plate and are directed along individual axes or lines radiating outward and downward from such central axis. The several circular series of pits communicate with similarly shaped grooves 14 formed in the bottom surface of the plate. One wall of each groove constitutes a deflector, and while the deflector grooves might be variously formed in so far as their relation to the several die units is concerned, the circular form is most convenient for machining. The inner wall 14$^a$, through which the die ports 15 are formed, is perpendicular to such ports, and the outer deflecting wall 14$^b$ is arranged at such an acute angle thereto as to be favorable to the impact thereagainst of the macaroni strips 16 delivered from the ports substantially in the direction of the port axes. As will be manifest, however, from the drawings, each strip after emerging from its die port will impinge against the wall 14$^b$ with a glancing action and will thereby be deflected.

Each die unit comprises a cup 17, preferably symmetrical as by being turned respecting its central axis and consists of a rim 18 of frusto-conical form and fitted into a pit 13 and upon a seat or shoulder 19, a hemispherical lower end 20, concentric with but spaced from a similarly shaped bottom of a chamber 21, constituting the bottom portion of the pit 13 and from the center of which the die port 15 emerges, and the cup includes also a pin or core or projection 22 extending from the end of the cup and along its axis and into the center of the port 15. One side portion of the cup bottom is cut away, forming a lateral hole 23 for delivery of the dough into the chamber, filling said space between the cut and pit bottoms. While macaroni is usually formed round in section, and the die units may accordingly be made somewhat easier for such formation, any other desired cross-sectional form may be provided for the product by simply changing the form of the die ports. For example, I show in Fig. 5 a die port 15' to form square stock and also a core 22' similarly formed to make a square hole running through the tubular macaroni strip.

The dough mass is presented to the die plate 10 and forced through the several units in any well known manner and with uniform speed and pressure, the dough for each unit passing through the cup, laterally through the hole 23, thence around within and filling the segmental space 21', whence it is forced through the port 15, the core 22 causing it to be formed tubular at such time.

The strip, after emerging from the port 15, is acted upon by a combination of forces, causing it to assume a spiral form. It impinges first against the wall 14$^b$, oblique to the axis of the port, and thereby is deflected downward, aided also by the force of gravity. It is deflected laterally, however, because more dough is forced through that side of the port adjacent to the hole 23 than elsewhere, and this fullness of dough at this side of the tube causes an elongation of this side of the tube, with the result that the tube is bent away from the side having the hole 23, or to the left, looking downward. Hence the tubular strip, as a result of the component of these forces, is produced in spiral form, a form not only pleasing to the eye but one most favorable to the food product.

The base 11 is formed with a vertical guide hole 24 for each die unit, the axis of each hole being offset laterally from the plane of the die unit in a direction corresponding to the lateral deflection of the tube just described. The smooth cylindrical wall of each guide hole, however, insures that the tubular spiral will be maintained substantially straight and of uniform gross diameter as it passes downward through it.

The force of gravity acting upon the soft dough as it emerges from the ports 15 is material, and affects the finished form variably according to the length of the strips. In other words, the pitch of the spiral or length between turns is more or less proportional to the length or weight of the entire strip up to the time it is severed off beneath the base. Hence the resulting spiral is one of variable pitch.

It will be noted that the cup 17 by its peculiar structure performs the double function of discharging the dough at one side of the pit while at the same time acting as an obstruction to prevent a rapid flow of the dough across the pit to that portion of the port adjacent the other side of the pit. This function is facilitated by the boreforming core 22 which serves not only to form the bore in the macaroni, but also to prevent a tendency for the pressure within the port to equalize by obstructing the flow of the dough to region of lesser pressure thus ensuring a finished product of the proper form. Owing to the size and location of the hole 23, the cup in effect constitutes an obstruction located closer to one side of the pit than to another as will be evident particularly by observing that a portion of the bottom of the cup is cut away in forming the hole whereby the total effect is that a larger space or entrance for the dough to the port is afforded at the right side of the pit. Each cup is fitted hermetically in and so seals the mouth of its pit 21, thereby compelling all the dough to pass through the cup and emerge from the port 23 thereof.

The inclined arrangement of the dies tends to cause a torque to be produced upon the macaroni issuing from the die as a result of the weight from the die hanging therefrom. This torque acts in conjunction with the tendency of the die to produce rotation thus facilitating the bending and proper rounding out of the macaroni.

I claim:

1. A macaroni die comprising a member having a pit having an axial port, a die cup fitted in and sealing the mouth of the pit and with its bottom spaced from the bottom of the pit, and said cup bottom having a lateral delivery hole at one side of the axis of the cup through which all the dough emerges, and whereby the dough as it emerges from the port is caused to bend laterally from said axis.

2. A die of the class set forth comprising a member having a pit with a port in its bottom, a die cup fitted in said pit and adapted to discharge a food product into said pit for delivery through said port, the cup being sealed around its rim to obstruct the flow of dough along the outside thereof, said cup comprising means for causing a greater pressure of the product at one part of the port than at the other so as to cause said product to emerge from the port in a direction other than parallel to the axis of the cup, as determined by the location of the region of greater pressure, and means to deflect the product laterally of said axis after it leaves the port.

In testimony whereof I affix my signature.

JOHN L. DE ANGELIS.